United States Patent Office 3,454,637
Patented July 8, 1969

3,454,637
4-HALO-N-ACYLAMIDES
Robert C. Petterson, New Orleans, La., assignor to Research Corporation, New York, N.Y., a non-profit corporation of New York
No Drawing. Original application Mar. 31, 1965, Ser. No. 444,420, now Patent No. 3,368,953, dated Feb. 13, 1968. Divided and this application Oct. 13, 1967, Ser. No. 688,639
Int. Cl. C07c *143/78, 103/88;* C07d *5/06*
U.S. Cl. 260—556      6 Claims

ABSTRACT OF THE DISCLOSURE

Novel 4-halo-N-acylamides of alkanoic acids having 4–8 carbon atoms in the aliphatic chain, wherein halo is chloro or bromo and the acyl group is loweralkanoyl or benzenesulfonyl, useful as intermediates in the preparation of gamma-lactones have been prepared.

---

This application is a divisional application of my application Ser. No. 444,420, filed Mar. 31, 1965, now U.S. Patent No. 3,368,953.

This invention relates to methods and intermediates useful in the production of γ-lactones.

The method of the invention is based on the discovery that N-acylamides of alkanoic acids can be readily N-halogenated with chlorine or bromine in good yields by treating the N-acylamides with an excess of tertiary alkyl hypochlorites or hypobromites preferably in an alkanol solution, and that the N-halo-N-acylamides of alkanoic acids containing at least four carbon atoms in the aliphatic chain bearing the acylamide group can be rearranged to the corresponding 4-halo-N-acylamides by irradiation, neat or in an inert solvent such as benzene, toluene, fluorotrichloromethane (Freon-11) or 1,1,2-trichlorotrifluoroethane (Freon-113), with actinic light. The acyl group may be any alkyl, aralkyl or aryl carbonyl or sulfonyl group.

The 4-halo-N-acylamides can be converted to the corresponding γ-lactones by treatment with boiling 10% sulfuric acid or by boiling with a 20% aqueous solution of potassium hydroxide, followed by acidification.

The following examples are illustrative of the principles of the invention:

Example I.—N-chloro-N-acetylvaleramide

N-chloro-N-acetylvaleramide, a pale yellow oil, ν (neat) 1730 cm.$^{-1}$, is made in good yield by the addition of 3 g. of t-butyl-hypochlorite to a solution of 2.1 g. of N-acetylvaleramide in methyl alcohol. The reaction mixture is allowed to stand for about 2½ hours in the dark at room temperature. It is then diluted with water and extracted with methylene chloride. The extract is washed with water, dried over sodium sulfate and evaporated under vacuum at room temperature.

Example II.—γ-Valerolactone

Irradiation of the N-chloroimide, neat or in solution in Freon-11, Freon-113, benzene or toluene in a Rayonet chamber reactor (3500 A. lamps) (Southern New England Ultraviolet Co.) or under a Victor 500-watt mercury vapor lamp for 2.5 hours gives 4-chloro-N-acetylvaleramide. The N-chloroimide may conveniently be irradiated in a quartz flask cooled to about 20° C. by a stream of tap water.

Treatment with boiling 10% sulfuric acid for about ½ hour converts the 4-chloro-N-acetylvaleramide to γ-valerolactone which can be extracted from the acid with chloroform.

Example III.—N-chloro-N-valerylbenzenesulfonamide

N-valerylbenzenesulfonamide (2.46 g.) and t-butyl hypochlorite (3.0 g.) allowed to react as in Example I for four hours give N-chloro-N-valerylbenzenesulfonamide in good yield as a pale yellow oil.

This product can be converted to 4-chloro-N-valerylbenzenesulfonamide by irradiation with actinic light and the 4-chloroamide can be converted to γ-valerolactone by treatment with boiling 10% sulfuric acid or by boiling with a 20% aqueous solution of potassium hydroxide followed by acidification and heating.

Example IV.—N-chloro-N-acetylbutyramide and γ-butyrolactone

In the same manner as in Examples I and II, N-chloro-N-acetylbutyramide, ν (neat) 1725 cm.$^{-1}$, 4-chloro-N-acetylbutyramide and γ-butyrolactone are made from N-acetylbutyramide.

Example V.—N-chloro-N-acetyl-4-phenylbutyramide and 4-phenyl-γ-butyrolactone

In the same manner as in Example I and II, N-chloro-N-acetyl-4-phenylbutyramide, M.P. 30–33° C., ν (neat) 1725 cm.$^{-1}$, 4-chloro-4-phenyl-N-acetylbutyramide and 4-phenyl-γ-butyrolactone, ν (CS$_2$) 1792 cm.$^{-1}$, are made from N-acetyl-4-phenylbutyramide.

Example VI.—N-bromo-N-acetylvaleramide

This compound is prepared as in Example I using t-butyl hypobromite instead of t-butylhypochlorite. It is readily rearranged to the 4-bromo-N-acetylvaleramide by the action of actinic light (visible or ultraviolet), and can be converted to γ-valerolactone as in Example II.

Other gamma-lactones which have been made by the methods of the foregoing examples are 4,4′-dimethyl-γ-butyrolactone, ν (CS$_2$) 1775 cm.$^{-1}$, from N-chloro-N-acetyl - 4 - methylvaleramide, and γ - octanoiclactone, ν (neat) 1775 cm.$^{-1}$, from N-chloro-N-acetyloctanamide.

Aromatic substances, such as benzene, naphthalene and triphenylene appear to act as sensitizers of the actinic rearrangement of the N-halogen to the 4-position. Particularly good yields of the 4-halo-N-acylamides are obtained by irradiation of the N-halo-acylamides in benzene or in solvent mixtures containing benzene.

I claim:
1. A 4-halo-N-acylamide of an alkanoic acid having 4–8 carbon atoms in the aliphatic chain wherein halo is chloro or bromo and the acyl group is loweralkanoyl or benzenesulfonyl.
2. A compound according to claim 1 wherein the acyl group is benzenesulfonyl.
3. A compound according to claim 1 wherein the acyl group is loweralkanoyl.
4. A compound according to claim 3 wherein the acyl group is acetyl.
5. 4-chloro-N-valerylbenezenesulfonamide.
6. 4-chloro-N-acetylvaleramide.

References Cited

Petterson et al.: I. Am. Chem. Soc., vol. 86, pp. 1648–49 (1964).

ALEX MAZEL, *Primary Examiner.*

J. A. NARCAVAGE, *Assistant Examiner.*

U.S. Cl. X.R.

204—158; 260—343.6, 561